June 2, 1931.  H. R. GOTTHARDT ET AL  1,808,135
AUTOMATIC VERTICAL ELEVATOR
Filed Nov. 20, 1929  5 Sheets-Sheet 1

Inventor
HENRY R. GOTTHARDT
WILLIAM E. CAIN

June 2, 1931.  H. R. GOTTHARDT ET AL  1,808,135
AUTOMATIC VERTICAL ELEVATOR
Filed Nov. 20, 1929    5 Sheets-Sheet 3

Inventor
HENRY R. GOTTHARDT
WILLIAM E. CAIN

C. L. Parker Jr.
Attorney

Patented June 2, 1931

1,808,135

UNITED STATES PATENT OFFICE

HENRY R. GOTTHARDT, OF LOUISVILLE, KENTUCKY, AND WILLIAM E. CAIN, OF JEFFERSONVILLE, INDIANA, ASSIGNORS TO LOGAN CO., INC., OF LOUISVILLE, KENTUCKY, A CORPORATION OF KENTUCKY

AUTOMATIC VERTICAL ELEVATOR

Application filed November 20, 1929. Serial No. 408,546.

This invention relates to automatic vertical elevators, and more particularly to an elevating conveyor adapted to selectively pick up article carriers or the like from one floor of a building and discharge them at another floor.

In the conveyor art vertical elevators have been manufactured for a number of years for use where it is desired to transfer articles from one floor to another, and such elevators usually consist of two parallel endless chains having swinging trays hung therebetween at regular intervals.

The trays or carriers connected to the chains usually include spaced horizontal fingers which pass between somewhat similar fingers forming loading or unloading platforms at various floors of the building whereby the passage of the fingers of the trays between those of the platforms causes the chains on their upward movement to pick up articles from a given floor and to discharge the articles by similar operating means at any desired floor in the building.

Conveyors of the type referred to are adapted to transfer an article from a lower to an upper floor or vice versa, and this result is possible by virtue of the fact that the vertical runs of the chains may be made to extend through as many floors of a building as desired whereby the upwardly moving runs of the chains are adapted to move articles to the upper limit of the chains and to discharge such articles at any desired floor in the building as the other run of the chain moves downwardly past successive floors. The loading and unloading stations at the different floors are hinged so that they may be moved into or out of the path of the carriers when it is not desired to load articles on the carriers or to remove articles therefrom. Thus on the upwardly moving side of the elevator, where all packages are picked up or loaded on the conveyor only one station or platform may be arranged in operative position to transfer an article to a carrier, all of the other loading platforms being arranged in inoperative position so as to permit the article first picked up to pass through the succeeding upper floors of the building.

Similarly, on the downwardly moving side of the elevator, where all of the packages are discharged, only one station is in operation at a time and this is the station at which the article or package is to be discharged.

The operation of the various loading and unloading stations or platforms has always been accomplished by means of levers, or by means of a motor operated from a push button at each separate floor.

An important object of the present invention is to provide a conveyor of the type referred to above wherein automatic means is provided for determining the destination of an article or package placed upon a carrier of the elevator.

A further object is to provide means traveling with or adjacent the article or the carrier therefor and operative as it approaches the station at which it is desired to discharge the article in order to place the platform at such station in operative position whereby the article will be discharged.

A further object is to provide an automatic conveying system of the character referred to which permits an article to be loaded on a carrier at any floor of a building and to predetermine the station at which the article is to be discharged without affecting the destination of articles carried by any of the other conveyor carriers.

A further object is to provide novel means for keying each article whereby suitable electrical operating circuits may be closed as the article approaches its desired destination to move the platform at such destination to operative position to permit the article to be discharged.

A further object is to provide an automatic conveyor system provided with control means whereby an article or an article tray may be placed in position adjacent a given loading station ready to move upon a carrier of the conveyor, and whereby the article will automatically travel into position on the next carrier moving past the station, provided such carrier does not already have an article thereon.

A further object is to provide a conveyor of the character referred to wherein the system is operative to permit an article tray to be placed in position adjacent a loading platform and movable by gravity to a position to be picked up by a carrier, the adjacent platform being operative to retain the article in such position until an empty carrier approaches the loading station to pick up the article waiting to be conveyed.

A further object is to provide means associated with a conveyor of the character referred to wherein the articles, or trays carrying the articles, are operative upon electrical control circuits to prevent any loading platform from being moved to operative position upon the approach of a loaded carrier.

Other objects and advantages of the invention will become apparent during the course of the following description.

In the drawings we have shown two embodiments of the invention. In this showing.

Referring to Figures 1 to 12 inclusive, the numerals 1 to 7 inclusive designate successive floors of a building between which it is desired to transfer articles. For example, the present apparatus provides means whereby articles on floor 1 can be transmitted to floor 5 or vice versa, or whereby articles may be transferred either upwardly or downwardly to any desired floors.

Figure 1:
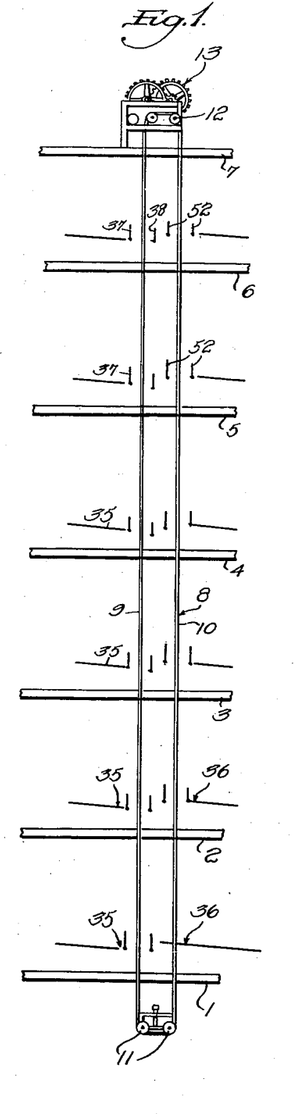
Figure 1 is a diagrammatic side elevation showing the installation of the apparatus.

Vertical movement of the articles between floors is effected by means of a conveyor including a pair of parallel chains indicated as a whole by the numeral 8 and each including upwardly and downwardly moving runs 9 and 10 respectively. The lower ends of the conveyor chains pass around suitable mounted pulleys 11, as shown in Figure 1, while the upper ends of the chains pass around similar pulleys 12 driven by any desired form of power apparatus indicated as a whole by the numeral 13, and forming no part of the present invention.

The runs of the conveyor chains pass through suitable openings in the several successive floors. For example, in Figure 2 it may be considered that the floor 2 is illustrated having an opening 14 therein through which the upwardly moving runs of the chain pass, and the floor also is provided with a similar opening 15 for the downwardly moving runs of the chains. Both runs of the chains extend between vertical guideways 16, as clearly shown in Figure 3, and these guideways carry inner guide plates 17 connected to the guideways by brackets 18.

Figures 2, 10:
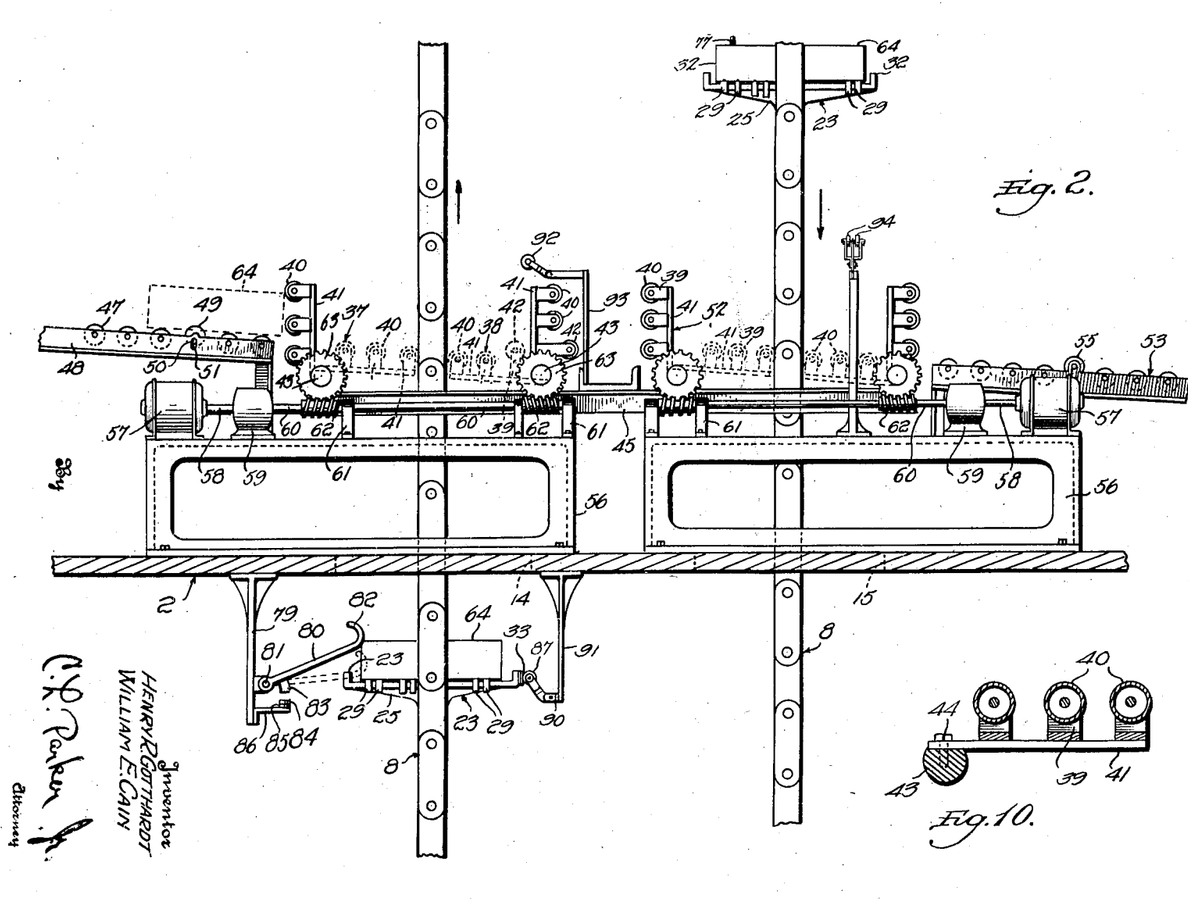
Figure 2 is a fragmentary sectional view through a floor of a building showing the installation of a loading and unloading station and associated elements.
Figure 10 is a detail view of one of the loading or unloading station gates.
Figure 11:
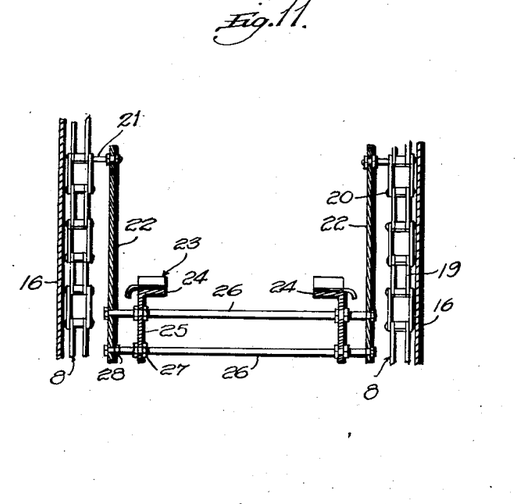
Figure 11 is a transverse sectional view through a portion of the apparatus illustrating the connection between the article carrier and the conveyor devices therefor.

Referring to Figures 2 and 11, it will be noted that the chain may be of any desired form and has been illustrated in the drawings as comprising links 19 connected by pivot pins 20. At intervals, pins or bolts 21 are connected to the two chains and extend inwardly therefrom to pivotally support depending parallel links 22 arranged adjacent the two chains.

Carriers 23 are connected to the chains for conveying the articles vertically. Each carrier comprises parallel side members 24 having horizontal top portions, and each carrier member 24 is provided with a central depending web 25, as shown in Figures 2 and 11. Transverse rods 26 extend between the two members of each carrier and are connected at their extremities to the depending links 22. Nuts 27 are arranged against opposite sides of the webs 25 to secure the members 24 against sliding movement along the rods 26, while the latter may be secured by nuts 28 to the lower ends of the links 22. It will be noted that each carrier is rigidly supported with respect to its links 22, while the latter are adapted to swing about the associated supporting bolts 21 whereby the links always assume vertical position and the carriers always remain horizontal.

Figures 3, 4, 5, 6, 7, 8, 9:
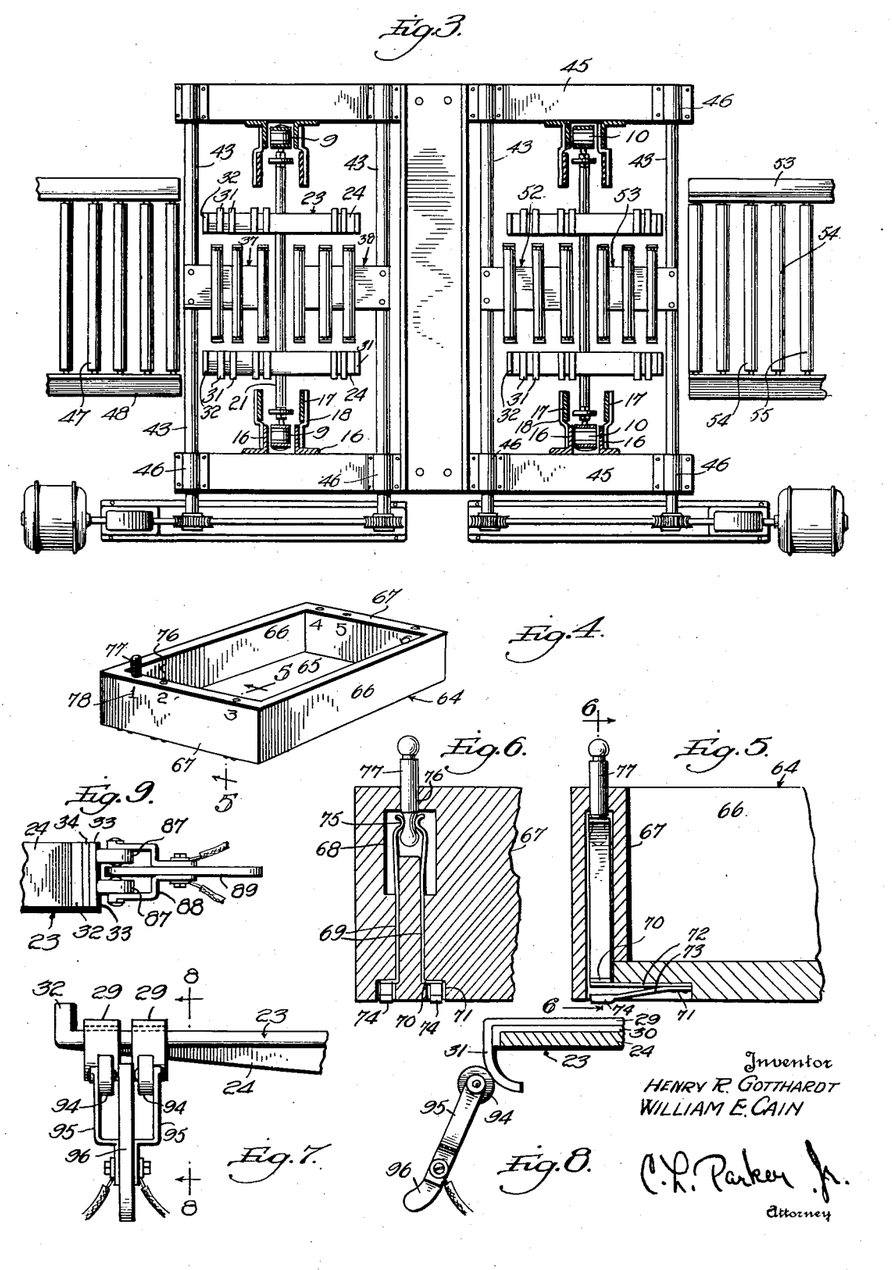
Figure 3 is a horizontal sectional view taken above the apparatus illustrated in Figure 2.
Figure 4 is a detail perspective view of a tray or article carrier.
Figure 5 is a transverse sectional view on line 5—5 of Figure 4.
Figure 6 is a section on line 6—6 of Figure 5.
Figure 7 is a detail view illustrating the engagement of a pair of contact rolls with contacts secured to a carrier.
Figure 8 is a detail section on line 8—8 of Figure 7.
Figure 9 is a fragmentary plan view of one end of a conveyor carrier associated with the control contacts arranged at the approach to each successive floor in a building.

Each carrier 23 is provided with a plurality of pairs of contacts 29, and as will be explained later, these contacts enter into the operation of the system to determine the destination of articles arranged on any given carrier. Referring to Figures 7 and 8, it will be noted that the contacts 29 are insulated from the associated carrier members 24 as at 30, and each contact is provided with a downwardly and inwardly projecting extension 31.

Each carrier member 24 is provided with an upturned end 32, and the upturned end of one of the carrier members of each pair is provided with a contact 33 insulated from the carrier as at 34. The purpose and operation of the contacts 29 and 33 will be referred to later.

Each floor of the building is provided adjacent the conveyor with a loading and unloading station indicated as a whole by the numerals 35 and 36 respectively in Figure 1 of the drawings. Referring to Figures 2, 3 and 10, the numerals 37 and 38 designate a pair of loading gates or platforms constituting a part of each loading station. Each of the gates comprises a plurality of U-shaped supporting members 39 having rollers 40 journaled in their ends, and each set of supports 39 is secured to a plate 41 extending transversely with respect thereto. The gate 38 is provided at the outermost side thereof with one of the supports 39 carrying a rod or roller 42 raised a substantial distance above the level of the rollers 40 for a purpose to be described.

Each of the gates is adapted to swing from a substantially vertical position, as shown in solid lines in Figure 2, to corresponding alined positions slightly inclined from the horizontal as shown in dotted lines in Figure 2. Referring to Figures 2 and 10, it will be noted that each transverse plate 41 is attached to an operating shaft 43. As shown, this shaft is flattened to provide a face against which the adjacent end of the plate 41 may contact, and each plate is secured to its corresponding shaft by screws 44 or similar fastening elements.

A pair of parallel bearing supports 45 are arranged on opposite sides of the loading and unloading stations of each floor, as shown in Figure 3, and bearings 46 are mounted on these supports to journal the shafts 43. It will be obvious that rotation of each shaft 43 through substantially one-quarter of a revolution is adapted to swing the corresponding gate from the vertical inoperative position to the lower operative position. When the gates are arranged in operative position, it will be noted that the adjacent ends of the gates are spaced somewhat to permit the rod 26 (see Figure 11) to pass therebetween. It will be noted from Figure 3 that the members 24 of each support are arranged apart a distance greater than the width of the gates, and accordingly it will be apparent that each carrier is adapted to move upwardly past each floor without interference with the gates, provided no articles are arranged on the carrier. In this connection, it may be noted that means are provided for preventing the gates from being arranged in the operative or loading position upon the upward approach of a loaded carrier. Such means will be referred to later.

Extending from the outer side of the loading station and in alinement with the rollers 40 is a plurality of conveyor rollers 47 journaled at their ends in supporting rails 48. One of the rollers 47 is adapted to move downwardly slightly under the weight of an article on the conveyor rollers for the purpose of closing a circuit to be referred to later. Such a roller is the floating roller 49 illustrated in Figure 2 and having its stub-shafts 50 vertically slidable in slots 51 formed in the rails 48. It will be apparent that any suitable form of floating roller may be employed for the purpose stated.

The elements forming the unloading station of each floor are identical with the elements of the loading station and need not be referred to in detail. The shafts 43 of the unloading stations carry gates indicated as a whole by the numeral 52, and these gates are identical with the gates 37 and 38 except that the rollers of the gates all are arranged in the same plane when the gates are in lower position, thus eliminating the use of an elevated roller or rod 42 as in the case of the gate 38. It will be apparent that each successive carrier 23 is adapted to move downwardly through the unloading gates, and any articles on the carrier will be picked up by any unloading gates if the latter are in lowered position, and any articles thus picked up by a pair of unloading gates will be delivered by gravity to a conveyor 53 having gravity rollers 54 included therein. The conveyor 53 and the gates 52, when the latter are in lowered position, are slightly inclined downwardly as indicated in Figure 2 whereby the articles will be discharged by gravity as previously stated. One of the rollers 54, as for example the roller 55, is a floating roller adapted to be moved downwardly upon the passage of an article thereover to close an electrical circuit to be referred to later.

Each loading and unloading station is provided with a supporting platform 56 upon which is mounted a motor 57, as shown in Figure 2. Each motor has its shaft 58 extending through a casing 59 in which is arranged speed reducing gearing (not shown) and a shaft 60 extends from the outlet side of the casing 59. This shaft is supported in suitable bearings 61 mounted upon the support 56, and a pair of worms 62 is carried by the shaft 60. Each worm meshes with a worm wheel 63 carried by one of the shafts 43, and accordingly it will be apparent that rotating movement of the gears 63 is adapted to swing the gates to upper and lower position. The power transmitting elements for the loading and unloading stations are identical as will be apparent.

Referring to Figures 4, 5 and 6, the numeral 64 designates an article tray or box in which any suitable articles are adapted to be carried, and the tray is adapted to be placed upon the carrier 23 to be conveyed between floors of the building. The tray includes a bottom 65 and side and end walls 66 and 67 respectively.

The end walls 67 of the tray are provided with recesses 68 as shown in Figure 6. A pair of contacts 69 is associated with each recess 68 and the contact strips have their lower ends bent outwardly as at 70 in small recesses 71 formed in the bottom of the tray. The out-turned ends 70 of the contact strips are soldered or otherwise secured to horizontal strips 72 at one end of the latter and the opposite ends of the strips 72 are secured to spring arms 73 having contacts 74 at their free ends.

The upper ends of the contact strips are provided with spaced curved portions 75 arranged in one of the recesses 68 as shown in Figure 6. The upper extremity of each end wall 67 is provided with an opening 76 communicating with each recess 68, and a jack plug or key 77 is adapted for insertion in each opening 76 to establish electrical connection between the upper ends of the contact strips 69.

As previously stated the carriers 23 are provided with pairs of contacts 29, and these contacts correspond in position to the pairs of contacts 74 of each tray 64. In other words, when a tray is arranged on one of the carriers, each pair of contacts 74 rests upon a pair of the contacts 29 and when one of the keys 77 is inserted in one of the openings 76, electrical connection will be established between the corresponding carrier contacts 29. The insertion of one of the keys 77 is for the purpose of determining the destination of a particular tray 64, and accordingly each tray bears indicia 78 associated with the openings 76 whereby an operator will be guided in inserting one of the keys 77 to determine the destination of a tray.

Referring to Figure 2, the numeral 79 designates a depending bracket carried by each floor of the building and supporting an arm 80 pivoted thereto as at 81. The arm 80 extends inwardly and is provided with an upwardly and backwardly turned end 82. The inner end of the arm 80 extends a slight distance inwardly of the extremities of the adjacent ends of the two side members of one of the carriers 23 as it passes the arm 80, and it will be apparent that the arm will remain in normal position if no tray 64 is arranged on the passing carrier.

Under such normal conditions, a projection 83 carried by the arm 80 will engage a stationary contact 84 insulated as at 85 from a small bracket 86 connected to the bracket 79. If a tray is arranged on the passing carrier however the tray itself will contact with the end 82 of the arm 80, thus swinging the latter upwardly to the position shown in Figure 2, the contact between the projection 83 and stationary contact 84 thus being broken. As will become apparent, the entrance of an article to a position on the gates 37 and 38 of the next upper floor above a contact arm 80 is dependent on this arm being in normal position, and such movement of the article accordingly will be prevented if one of the trays 64 is arranged upon the carrier 23 as it approaches a given floor from the floor below.

As previously stated, one end of one of the carrier members 24 is provided with a contact 33, as shown in Figure 9, and these contacts are adapted to engage a pair of contact rollers 87. These rollers are carried by contact arms 88 insulated from each other as at 89, and the roller structure referred to is carried by a small bracket 90 secured to the lower end of a depending bracket 91 extending downwardly from each of the floors of the building, and preferably opposite each arm 80. Contact between the rollers 87 is established through the contact 33 at the time each carrier passes one of the arms 80. Operation of the means for transferring an article to a loading platform is dependent upon the establishment of the electrical connection between the rollers 87 as well as upon the engagement of the projection 83 and contact 84, and thus it will be apparent that an article on any given floor can move to the loading platform only as a carrier approaches the floor and establishes connection between the rollers 87, and provided no tray 64 is already on such carrier.

Above each floor is arranged another pair of contact rollers 92 identical with the rollers 87 and connected to a support 93 projecting upwardly from the corresponding floor of the building. The rollers 92 also are adapted to engage the contact 33 after the carrier passes a floor, and this operation is utilized for effecting the return movement of the gates 37 and 38 to inoperative position, provided they were previously arranged in operative position to permit a tray to be picked up by a carrier.

As previously stated the carrier contacts 29 are adapted to determine the destination of a tray on a carrier, and accordingly each floor of the building is provided with means adapted to establish connection across the contacts 29 associated with each particular floor. Referring to Figures 2, 7 and 8, the numeral 94 designates a pair of contact rollers each carried by a contact arm 95, and these arms are separated from each other by an insulating member 96. It will be apparent that if one of the keys 77 is establishing contact between the contact strips 69 associated with the particular contacts illustrated in Figure 7, electrical connection will be established between the arms 95 and thus a circuit will be closed to operate the unloading gates to swing the latter to closed position. The rollers 94 are arranged above each floor, as shown in Figure 2. It will be apparent that these rollers are arranged in different positions for each floor so as to engage the proper contacts 29 of the carrier and thus determine the proper destination of the trays on the carriers.

Figure 12:
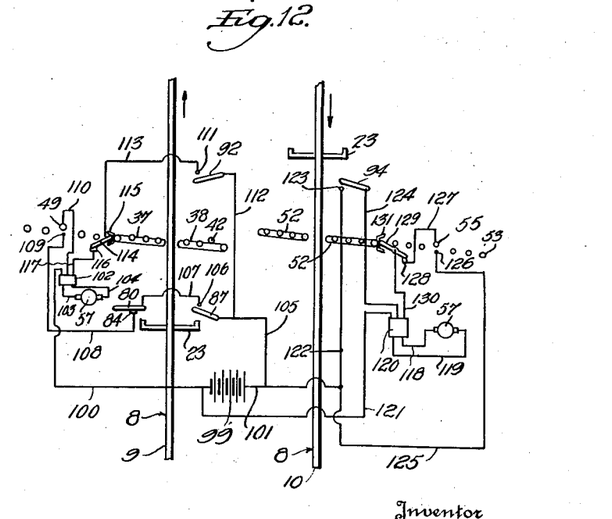
Figure 12 is a diagrammatic view illustrating the electrical connections.

The electrical system associated with one of the floors of the building is illustrated in Figure 12 of the drawings. As shown, the numeral 99 designates a source of current connected respectively to wires 100 and 101, the former of which leads to a reverse mechanism 102 for the motor 57 of the loading station. This motor is connected to the reverse mechanism by wires 103 and 104.

From the wire 101 of the source, a lead wire 105 is connected to a switch arm 87, which has been substituted in the diagrammatic view for the rollers 87 which it is adapted to represent. The switch arm is movable upwardly by a carrier into engagement with a contact 106, this operation corresponding to the establishment of electrical connection between the rollers 87 by the contact 33. The contact 106 is connected in series with the arm 80 by a wire 107, and this arm as previously stated, normally engages the stationary contact 84. The latter contact is connected by a wire 108 to a stationary contact 109 adapted to be engaged upon depression of the floating roller 49, and this roller is connected by a wire 110, to the reversing mechanism 102.

The contact rollers 92 have been illustrated in Figure 12 as a switch arm adapted to engage a contact 111, and the switch arm 92 is connected to the source 99 by a wire 112 which in turn is connected to the wire 105. A wire 113 is connected between the contact 111 and a switch arm 114 adapted to be operated by the gate 37. This gate is shown diagrammatically in Figure 12 as being provided with a forked member 115 adapted to operate the switch 114 whereby the latter engages a contact 116 when the gate is in lower position, and is disengaged from this contact when the gate is raised. The contact 116 is connected to the reversing mechanism 102 by a wire 117.

The motor 57 of the unloading station is connected by wires 118 and 119 to a reversing mechanism 120, and a wire 121 leads from the reversing mechanism to the wire 100 as shown. The wire 101 is connected to a wire 122 leading to a contact 123 adapted to be engaged by the switch arm 94 which has been substituted in the diagrammatic view for the rollers 94 illustrated in Figure 2. In other words, the switch arm 94 is adapted to engage the contact 123 when one of the trays is keyed to correspond to the particular floor illustrated in Figure 12. From the switch arm 94 a wire 124 leads to the reversing mechanism 120.

The wire 101 also is connected to a wire 125 leading to a stationary contact 126 adapted to be engaged upon depression of the floating roller 55 of the conveyor 53. From the roller 55 a wire 127 leads to a stationary contact 128 adapted to be engaged by an arm 129. A wire 130 connects the arm 129 to the reversing mechanism 120. The arm 129 is illustrated diagrammatically as being adapted to be engaged by a fork 131 connected to the adjacent gate 52 whereby the arm 129 will engage the contact 128 when the gates 52 are in lower position and will be disengaged when the gates 52 reach an open position.

The wiring of each floor except the first will be identical with that illustrated in Figure 12, and it will be apparent that the same source of current may be employed for the entire apparatus. In connection with floor 1 of the building, it will be noted that there is no reason for rendering the unloading platform of such floor inoperative and accordingly a fixed unloading platform is arranged on floor 1, thus making it impossible for any trays on the carriers to pass therebelow.

In Figures 13 to 16 inclusive a mechanically operated modified form of the invention is shown to provide relatively simple means whereby articles may be delivered from the first or succeeding floor of a building to any of the upper floors thereof. In this form of the invention, the system has been illustrated diagrammatically in Figure 13 in which figure the numerals 132 to 137 designate successive floors of a building in which it is desired to provide means for transferring articles from any of the lower floors to any desired floor.

Figures 13, 14:
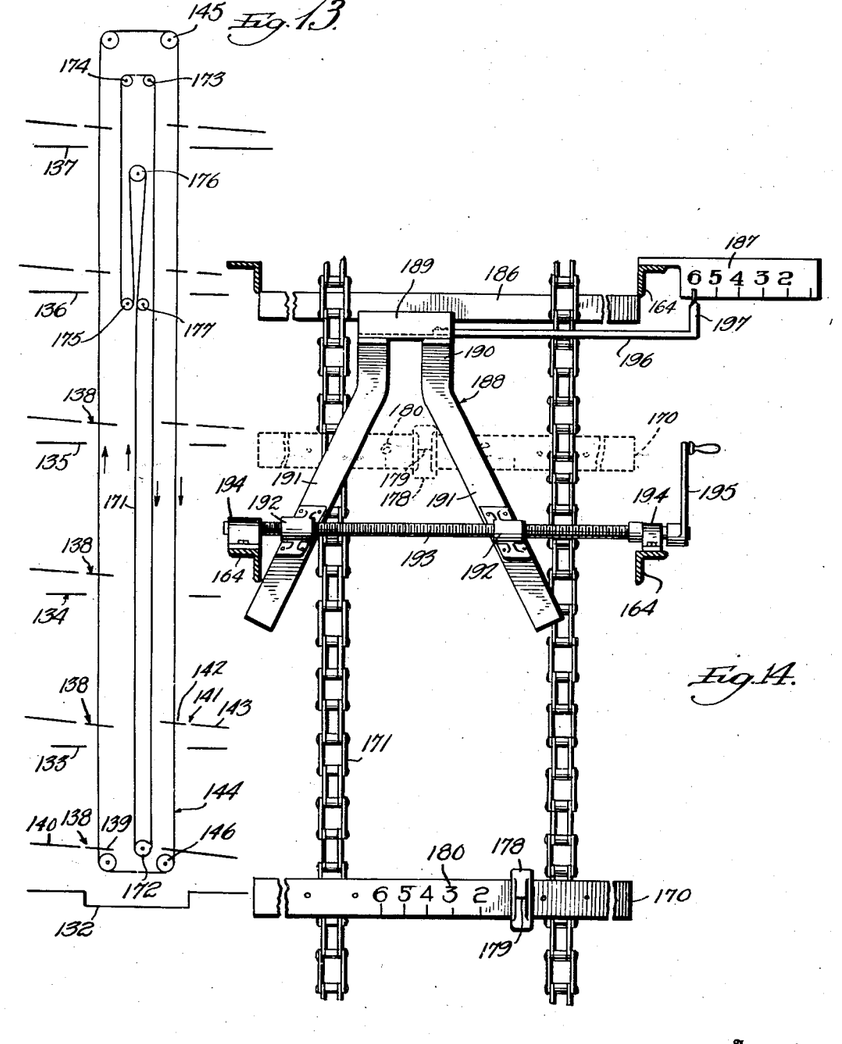
Figure 13 is a view similar to Figure 1 showing a modified form of the invention.
Figure 14 is an enlarged detail view showing the destination controlling means for the modified form of the apparatus.

The lower floors of the building are provided with loading stations indicated as a whole by the numeral 138 and each includes a loading platform 139 and a conveyor 140 for delivering articles thereto. Each upper floor includes an unloading station 141 including an unloading platform 142 and a take-off conveyor 143. The movement of articles between the floors is accomplished by means of a pair of conveyor chains 144 which may be similar in structure to the conveyor chains previously described and passing over upper pulleys 145 and lower pulleys 146.

Figure 15:
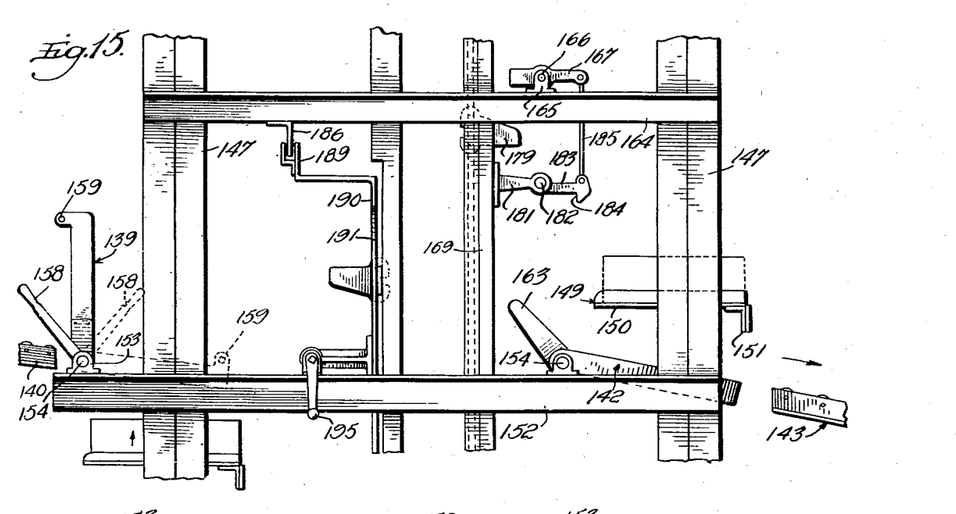
Figure 15 is an enlarged fragmentary side elevation of a portion of the modified apparatus.
Figure 16:
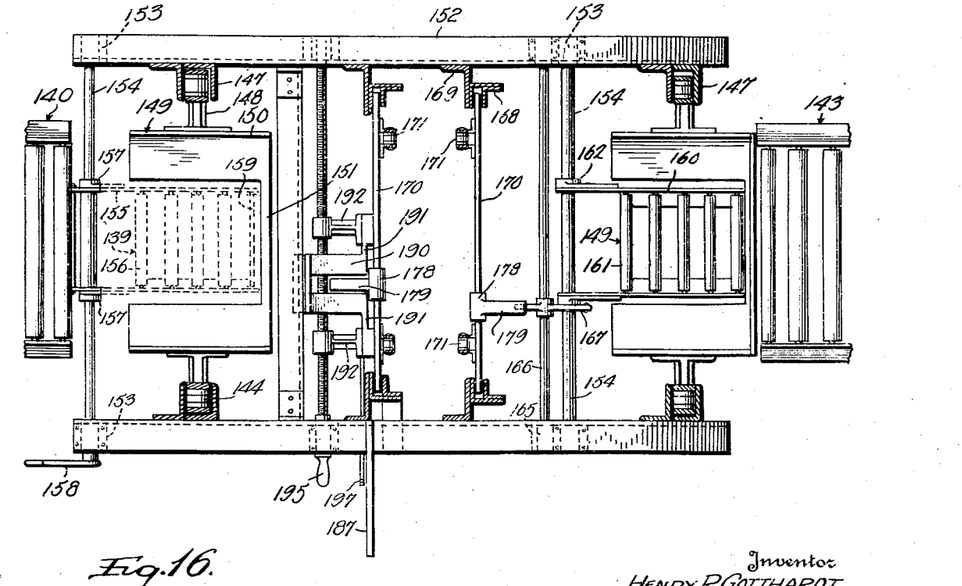
Figure 16 is a horizontal sectional view taken above the apparatus illustrated in Figure 15.

Referring to Figures 15 and 16, the numeral 147 designates a pair of parallel guide rails arranged on each side of each run of the conveyor chains 144 whereby the chains will be guided in their upward and downward movement. The chains 144 are provided at intervals with inwardly extending brackets 148 to which are connected carriers indicated as a whole by the numeral 149. Each carrier comprises outer parallel horizontal members 150 connected by a cross member 151, as shown in Figure 16. Thus each carrier is substantially U-shaped and provides a central space to permit the carriers to pass by each loading station to be referred to.

At each floor, a pair of parallel frame members 152 are employed for supporting bearings 153 in which are journaled shafts 154. In the present case, the loading and unloading platforms 139 and 142 differ from the form previously described in that the platforms are integral instead of comprising opposite sides adapted to be moved upwardly and downwardly. As shown in Figure 16, each loading and unloading station comprises parallel side rails 155 between which are journaled rollers 156, and hangers 157 are provided for securing the stations to their respective shafts 154. In Figures 15 and 16, the shafts 154 of the loading stations have been shown as being provided with manually operable handles 158, although it will be apparent that power operating means for the loading stations may be employed.

When the handle 158 of a loading station is in the dotted line position shown in Figure 15, the corresponding loading platform will be in the vertical position and will act as a stop for any articles which may be arranged on the conveyor 140 waiting to travel upon the loading platform. The platform may be lowered under such conditions by swinging the handle 158 to the dotted line position, in which case articles on the adjacent conveyor may move by gravity to the loading platform, and movement of the article will be limited by a cross-rod 159.

Each unloading station 142 includes side rails 160 having gravity rollers 161 journaled therebetween, and hangers 162 are adapted to connect the side rails 160 to the associated shafts 154. Each unloading station shaft is provided with an operating crank 163 secured to the shaft, and the operating crank of each floor is arranged at a different relative position on its shaft 154 for a purpose to be described.

At a point spaced from each floor, horizontal rails 164 are connected between the pairs of guides 147, as shown in Figure 15. These rails support bearings 165 at opposite sides of the apparatus and a shaft 166 is mounted in these bearings and connected to a rocker arm 167. Each rocker arm is arranged in vertical alinement with the operating crank 163 of the corresponding floor for a purpose to be described.

Referring to Figures 15 and 16, the numeral 168 designates guide rails carried by brackets 169 connected to the horizontal rails 152. Transverse bars 170 are arranged with their ends in the guides 168 to travel vertically therebetween, and the bars 170 are connected at spaced intervals to a pair of chains 171 which may be considerably lighter than the chains 144 of the conveyor. Referring to Figure 13, it will be noted that the chains 171 pass around lower sprockets 172, and the upper end of the downwardly moving runs of the chains pass over sprockets 173 arranged above the upper floor 137. Adjacent the sprockets 173, the chains pass around similar sprockets 174 and thence downwardly a substantial distance to pass around idler sprockets 175. The portions of the chains beyond the sprockets 175 pass around sprockets 176 and contact with idler sprockets 177 therebelow. The chains 171 are caused to follow the paths just described in order that these chains may be of a length equal to the length of the chains 144 for a purpose to be described.

Referring to Figures 14 and 16, it will be noted that each bar 170 is provided with a slide 178 having an outwardly projecting finger 179. The position of the finger 179 of each bar 170 determines the destination of articles being conveyed by the conveyor chains as will become apparent, and as a guide for the operator, each bar 170 is provided with suitable indicia 180 to indicate the proper position of the finger in order to deliver articles on a given conveyor carrier to a given destination.

The fingers 179 are adapted to be adjusted longitudinally of the bars 170 to place them in the same vertical planes as the rocker arms 167 and the operating cranks 163 so that these elements will be operated by the fingers 179. Referring to Figure 15, the numeral 181 designates supporting brackets carried by the uprights 169 and supporting a transverse shaft 182. A locking finger 183 is connected to the shaft 182 and is provided with a depending latch element 184 adapted to engage one of the unloading stations 142 when the latter is in inoperative position. A flexible member 185 connects the fingers 183 to the rocker arm 167. It will be apparent that one of the locking devices referred to is employed for each floor except the first, and in this connection it will be noted that the unloading platform 142 of the first floor need not be movable, since there is no occasion for delivering articles at the first floor.

Means are provided for setting the fingers 179 of the bars 170 to determine the destination of articles in the carriers. Such means will be identical for each floor from which it is desired to start an article for transportation to another floor, and only one of the means therefore need be referred to. The setting means has been illustrated in Figures 14, 15 and 16. Referring to these figures the numeral 186 designates a transverse angle iron secured at its ends to the rails 164, one of which is provided with an indicating scale 187.

A setting member indicated as a whole by the numeral 188 is provided at its upper end with a cross head 189 which is channeled as shown in Figure 15 to receive the depending web of the angle iron 186 to be transversely guided thereby. The guide member further includes a pair of depending arms which are parallel at their upper ends as indicated at 190 and arranged a distance apart slightly in excess of the width of each of the slides 178. The arms of the guide member diverge outwardly toward their lower ends as at 191, and each is provided with an internally threaded bearing member 192 receiving a threaded rod 193. This rod is journaled at its ends in bearings 194 mounted upon the supports 164. One end of the rod 193 is provided with an operating handle 195, rotation of which is adapted to move the setting device longitudinally with respect to the angle iron 186. The setting device is provided with a laterally extending arm 196 having its extremity turned upwardly at 197 to form a finger cooperating with the scale 187.

The operation of the form of invention illustrated in Figures 1 to 12 inclusive is as follows:

Articles are placed in one of the trays 64 on one of the floors of the building and it is desired to deliver such articles to another floor. For example, it may be desired to deliver articles from floor 2 to floor 6, and under such circumstances, the articles will be loaded in a tray and one of the keys 77 will be inserted in the opening 76 corresponding to the proper floor of delivery, in this case floor 6. The tray is then placed on the conveyor rollers 47 to be conveyed to the loading station of floor 2. The adjacent gate of the platform normally is arranged in the solid line or vertical position indicated in Figure 2, and accordingly will act as a stop to limit the movement of the tray. Thus the tray will stop in the dotted line position shown in Figure 2, and will rest upon the floating roller 49 to depress the latter and thus close the circuit to the contact 109 (see Figure 12). The tray will remain in such position pending the arrival of one of the carriers of the conveyor chain 8.

As an upwardly moving carrier approaches floor 2, which is now being considered, the operation of the parts to determine whether the tray 64 passes over to the loading position will be determined by whether the approaching carrier is empty or has a tray arranged thereon. Assuming that a tray has been placed on a carrier at floor 1, such carrier will approach floor 2 and will pass through the postion indicated by the carrier 23 in Figure 2.

Under the conditions stated, the contact 33 will bridge across the rollers 87, thus closing the circuit to contact 106 (see Figure 12). The completion of the circuit through this contact however is dependent upon the arm 80 being arranged in its normal or downward position, but inasmuch as a tray is arranged on the carrier, the tray will lift the arm 80 thus breaking the circuit to the contact 84, and accordingly the motor will not operate. Thus the loading platform of floor 2 will remain in open position and the carrier will pass through floor 2 without interference from the loading platform thereof.

Assuming however, that an empty tray approaches floor 2, it will be apparent that all of the operations just described will take place except that the absence of a tray on the carrier 23 permits the arm 80 to remain in normal position, and a circuit will be established through motor 57 associated with the loading station of floor 2. Accordingly the shaft 60 will be rotated to drive the worms 62, such rotation taking place at materially reduced speed by virtue of the speed reduction gearing in the casing 59. Rotation of the worms 62 obviously rotates the worm wheels 63 thus moving the gates of the loading platform to operative position, whereupon the tray will move by gravity to a position on the loading platform, and its movement will be arrested by the rod or roller 42. Movement of the tray in the manner referred to releases the floating roller 49 thus breaking the circuit through the motor.

The empty carrier will then pass upwardly through floor 2 and will pick up the tray from the loading platform. Continued upward movement of the carrier brings the contact 33 into engagement with the rollers 92, whereupon the motor will be reversed to return the loading platform to inoperative position. In this connection, it will be noted that the reverse circuit is dependent not only on closing the circuit through rollers 92, that is, through the contact 111 in Figure 12, but also is dependent upon the arrangement of the switch arm 114 in operative position in engagement with the contact 116. The movement of the gate 38 to operative position brings the switch 114 into engagement with the contact 116, and thus a circuit will be completed through the motor, after passing through the reversing mechanism 102, and thus the motor will reverse to move the gates of the loading platform to inoperative position. In this connection it will be noted that if the loading gates have not been previously moved to operative position, the reversing circuit cannot be closed since the switch 114 will not be in engagement with the contact 116.

The carrier with the tray thereon will move upwardly to the top of the conveyor, whereupon the chains 8 will pass around the sprockets 12 to start their downward movement. As previously stated, the carrier with the tray thereon will remain in normal position during the movement of the chain referred to inasmuch as the carrier is pivotally suspended from a pair of the bolts 21. After the carrier has passed over the top of the conveyor and starts its downward movement, the unloading mechanism at floor 6, for example, will operate to discharge the tray at such floor.

The tray is provided with pairs of contacts 74 corresponding in location and arrangement to the carrier contacts 29, and accordingly one pair of these contacts will be electrically connected by virtue of the presence of a key in one of the openings 76. In the present instance, it is considered that the tray is to be unloaded at floor 6, in which case the contacts 29 corresponding in position to the rollers 94 of floor 6 will be electrically connected.

As the carrier moves downwardly to approach floor 6 under the conditions stated, electrical connection will be established between the rollers 94, that is, to contact 123 shown in Figure 12. Thus a circuit will be completed through the motor of the unloading station to swing the unloading platform gates to operative position, and as the carrier passes through this station, the tray will be deposited on the unloading station and will move therefrom by gravity to the conveyor 53.

As the unloading platform members move to operative position, the arm 129 will be swung to operative position in engagement with the contact 128, and as the tray moves over the conveyor 153, it will depress the floating roller 55 to close a circuit to the contact 126, which is arranged in series with the contact 128. Thus the motor will be reversed by the connection of the circuit referred to through the reversing mechanism 120, and the unloading gates will swing again to inoperative position during which movement the arm 129 will be moved out of engagement with the arm 128.

The operation of the system is identical at each loading and unloading station except that the unloading station on floor 1 need not be provided with pivoted gates since no trays are to move beyond such unloading station. Accordingly it will be apparent that a tray may be picked up automatically at any loading station and will be discharged at any desired station automatically merely by inserting a key in the proper opening 76.

The form of the apparatus illustrated in Figures 13 to 16 inclusive is mechanical in operation rather than electrical, and while not fully automatic, it is comparatively simple in construction and economical to manufacture and is preferred in some instances for such reason. Articles may be loaded on the conveyor in the installation illustrated in Figure 13 at any of the first four floors of the building, and may be discharged from the conveyor at any of the floors.

Assuming that an operator on the first floor of the building desires to have a tray or article conveyed to the fourth floor of the building, he will rotate the handle 195 to bring the pointer 197 into registration with the number "4" on the scale 187. As the next bar 170 moves upwardly with the chains 144, the finger 179 of the bar will be guided by the diverging arms 191 to a proper position on the bar, or in other words, to a position corresponding to the position for which the indicator 197 has been set. Before the carrier 149 comes upwardly to the loading station, the operator will manually move the loading platform 139 to operative position, whereupon the article will move by gravity to a position on the loading platform. The approaching carrier thus will pick up the article and move it upwardly to the top of the conveyor, and thence downwardly to the proper floor at which the article is to be discharged.

In this connection it will be noted that the bars 170 correspond in position to the positions of the carriers 149, and they maintain such relative positions throughout their downward movement in the lower runs of the chains 144 and 171. The arrangement of the sprockets 175, 176 and 177 is provided to compensate for the difference in the over-all sizes of the chains 144 and 171 whereby the corresponding positions of a bar 170 and a carrier 149 while passing by the loading stations may be retained while moving downwardly past the various floors.

In the instance being considered, the article is to be delivered at the fourth floor in which case the finger 179 will be arranged in the vertical plane of the rocker arm 167 and operating lever 163 of the fourth floor. Accordingly, as the carrier approaches the fourth floor, the corresponding finger 179 will trip the rocker arm 167, thus elevating the latch arm 183 and releasing the corresponding unloading platform to permit the latter to drop to the operative position shown in Figure 15. Thus as the carrier passes the unloading platform, the article will be deposited thereon and will move from the platform by gravity over the conveyor 143.

The operating finger 179 will then engage the crank 163 of the loading platform, thus moving the crank downwardly and swinging the unloading platform upwardly into engagement with the latch finger to be held in in operative position thereby until another article approaches to be discharged at the same floor. Thus the device is operative to move the unloading platform to operative position, and then to inoperative position after the article has been discharged.

It is to be understood that the forms of the invention herewith shown and described are to be taken as preferred examples of the same and that various changes in the shape, size, and arrangement of parts may be resorted to without departing from the spirit of the invention or the scope of the subjoined claims.

We claim:

1. An elevating conveyor comprising endless chain conveying means including a carrier movable therewith, a plurality of loading and unloading stations each including a station member movable from an inoperative position out of the vertical plane of the conveying means to an operative position in the vertical plane of the conveying means, means controlled by the carrier when moving upwardly for automatically moving the next station member to operative position provided there is an article at such station to be picked up by the carrier, and means operative by an article on the carrier for rendering said last named means inoperative.

2. An elevating conveyor comprising endless chain conveying means including a carrier movable therewith, a plurality of loading and unloading stations each including a station member movable from an inoperative position out of the vertical plane of the conveying means to an operative position in the vertical plane of the conveying means, station selector means carried by and adapted to travel with an article picked up by the carrier from a loading station for determining the station at which the article will be discharged, and means operative by said selector means upon the approach of the carrier to the selected station for moving the station member thereof to operative position whereby the article will be deposited thereon.

3. An elevating conveyor comprising endless chain conveying means including a carrier movable therewith, a plurality of loading and unloading stations each including a station member movable from an inoperative position out of the vertical plane of the conveying means to an operative position in the vertical plane of the conveying means, a plurality of mutually dependent coacting means for determining the position of each station member of the loading stations upon the approach of the carrier thereto, one of said coacting means being rendered operative by the presence of an article at a loading station and another by the approach of the carrier to a station, the other coacting means being normally operative and being adapted to be rendered inoperative to prevent a loading station member from moving to operative position upon the approach to the station of the carrier when loaded.

4. An elevating conveyor comprising endless chain conveying means including a carrier movable therewith, a plurality of loading and unloading stations each including a station member movable from an inoperative position out of the vertical plane of the conveying means to an operative position in the vertical plane of the conveying means, a pair of coacting means operable when simultaneously actuated for moving the station member of each loading station to operative position, one of said coacting means being actuated by an article at a loading station and the other by a carrier approaching such station, and means for rendering both of said coacting means inoperative upon the approach to a loading station of the carrier when loaded.

5. Apparatus constructed in accordance with claim 4 provided with means operative after the carrier passes an operative loading station member for returning such member to normal position.

6. Apparatus constructed in accordance with claim 4 wherein said last named means comprises a normally operative switch arm adapted to be moved to inoperative position by an article on an approaching carrier, said switch arm being arranged out of the path of travel of the carrier to permit an empty carrier to pass said switch arm without effecting movement thereof.

7. An elevating conveyor comprising endless chain conveying means including a carrier movable therewith, a plurality of loading and unloading stations each including a station member movable from an inoperative position out of the vertical plane of the conveying means to an operative position in the vertical plane of the conveying means, electrical means for moving each loading station member to operative position, a circuit for said electrical means including a plurality of switches connected in series and adapted when closed to cause said electrical means to move a station member to operative position, one of said switches being normally closed and movable to open position by an article on the carrier approaching a loading station, the other switches being operative respectively by the approach of a carrier to a station and by an article at a loading station whereby the approach to a loading station of the carrier when unloaded is adapted to move the loading member of such station to operative position provided there is an article at such station to be picked up by the carrier.

8. Apparatus constructed in accordance with claim 7 provided with a reverse circuit for said electrical means operative to return a loading station member from operative to inoperative position after the carrier has passed such member and picked up an article therefrom.

9. Apparatus constructed in accordance with claim 7 provided with a reverse circuit for said electrical means, said reverse circuit including a pair of switches one of which is closed by movement of a loading station member to operative position and the other by the carrier after it moves past an operative member and picks up an article therefrom.

10. An elevating conveyor comprising endless chain conveying means including a carrier movable therewith, a plurality of loading and unloading stations each including a station member pivoted to swing from an inoperative position out of the vertical plane of the conveying means to an operative position in the vertical plane of the conveying means, each loading station member including a plurality of conveyor rollers and including a stop member to limit the movement of an article on the station member to a position in vertical alinement with the carrier to be picked up thereby, a supply conveyor for each loading station, each loading station member forming a continuation of its supply conveyor when in operative position and forming a stop therefor when in inoperative position, means controlled by the carrier when moving upwardly and unloaded for automatically moving the next station member to operative position provided there is an article at such station to be picked up by the carrier, and means operative by an article on the carrier for rendering said last named means inoperative.

11. Apparatus constructed in accordance with claim 10 wherein the means controlled by the carrier includes a circuit having one switch adapted to be held closed by an article on a supply conveyor adjacent a loading station and a second switch adapted to be closed by the carrier upon its approach to a loading station, the means operative by an article on the carrier for rendering said last named means inoperative comprising a normally closed switch in said circuit adapted to be opened by an article on the carrier approaching a loading station.

12. Apparatus constructed in accordance with claim 10 provided with reverse means for moving each loading station member from operative to inoperative position, said reverse means being operative by said carrier after the latter has passed beyond the operative member.

13. An elevating conveyor comprising endless chain conveying means including a carrier movable therewith, a plurality of loading and unloading stations each including a station member movable from an inoperative position out of the vertical plane of the conveying means to an operative position in the vertical plane of the conveying means, station selector means carried by and adapted to travel in conjunction with said carrier and adapted to be placed in selected positions according to the unloading station at which it is desired to discharge an article on the carrier, and means at each unloading station occupying different positions according to the selected positions of said station selector means and operative thereby to bring the proper unloading station member into operative position to receive an article on the carrier.

14. Apparatus constructed in accordance with claim 13 provided with means operative after an unloading station member has been moved to operative position and the carrier has passed thereby for returning the station member to inoperative position.

15. An elevating conveyor comprising endless chain conveying means including a carrier movable therewith, a loading station movable to an operative position in the vertical plane of the conveying means whereby said carrier will pick up an article on said loading station, a plurality of unloading stations each including a station member normally arranged in an inoperative position and movable to an operative position whereby an article on the carrier will be discharged thereon, means adapted to travel with the carrier for determining the destination of an article thereon, electrical means operable for moving each station member to operative position and operable by the station determining means, and electrical means connected to each unloading station and operative for closing a circuit through said electrical means to return an unloading station member to inoperative position after said carrier has passed such station and deposited an article thereon.

16. Apparatus constructed in accordance with claim 15 wherein said last named means includes a normally open switch adapted to be closed upon movement of the corresponding unloading station member to operative position.

17. An elevating conveyor comprising a pair of vertical chains having opposite runs arranged parallel and moving upwardly and downwardly respectively, a carrier comprising a pair of spaced parallel members and a supporting cross member therefor connected at its ends to said chains, a plurality of loading stations each comprising a pair of oppositely arranged pivoted gates adapted to swing to a substantially horizontal operative position with their inner ends spaced to permit said cross member to pass therebetween, said gates being movable between said operative position and substantially vertical inoperative positions, means controlled by the carrier when moving upwardly and approaching a loading station for automatically swinging the gates of such station to operative position provided there is an article at the station to be picked up by the carrier, and means operative by an article on the carrier for rendering said last named means inoperative.

18. Apparatus constructed in accordance with claim 17 provided with means operative by a carrier after passing the station having its gates in operative position for returning the gates to inoperative position.

19. Apparatus constructed in accordance with claim 17 wherein said loading stations are arranged adjacent the upwardly moving runs of said chains, a plurality of unloading stations arranged adjacent the downwardly moving runs of said chains, and means carried by an article picked up from a loading station for determining the unloading station at which the article shall be discharged.

20. An elevating conveyor comprising a pair of vertical chains having opposite runs arranged parallel and moving upwardly and downwardly respectively, a carrier comprising a pair of spaced parallel members and a supporting cross member therefor connected at its ends to said chains, a plurality of loading stations each comprising a pair of oppositely arranged gates pivoted at their remote ends to swing to a substantially horizontal operative position with their inner ends spaced to permit said cross member to pass therebetween, said gates being movable between said operative position and substantially vertical inoperative positions, a supply conveyor for each pair of gates and including a plurality of rollers, said gates when in operative position forming a substantial continuation of said supply conveyors, the gate adjacent each supply conveyor acting as a stop therefor when in inoperative position, and coacting electrical control means actuated by the carrier when moving upwardly and approaching a loading station for automatically swinging the gates of such station to operative position and dependent upon the presence of an article adjacent such station.

21. Apparatus constructed in accordance with claim 20 provided with means arranged in the path of travel of an article on the carrier as it approaches the station and adapted to be operated by such article to prevent the gates of the station from moving to operative position.

22. Apparatus constructed in accordance with claim 20 provided with electrical means operative by a carrier after passing a station for swinging the gates thereof to inoperative position, said last named means being dependent upon the gates having swung to operative position prior to the passage of the carrier thereby.

23. Apparatus constructed in accordance with claim 20 wherein one roller of each supply conveyor adjacent the corresponding gates is movable downwardly to close a switch forming a part of said coacting electrical means.

24. Apparatus constructed in accordance with claim 20 wherein said coacting electrical control means includes a motor for swinging each pair of gates, a switch adapted to be closed by a carrier approaching each loading station, and a switch adapted to be closed by an article arranged on one of said supply conveyors adjacent the loading station thereof, said control means further including a switch normally closed and arranged in the path of travel of an article on the carrier as it approaches each station and adapted to be opened by the article to prevent operation of said control means.

25. Apparatus constructed in accordance with claim 20 wherein said coacting electrical control means includes a motor for swinging each pair of gates, a switch adapted to be closed by a carrier approaching each loading station, and a switch adapted to be closed by an article arranged on one of said supply conveyors adjacent the loading station thereof, said control means further including a switch normally closed and arranged in the path of travel of an article on the carrier as it approaches each station and adapted to be opened by the article to prevent operation of said control means, and a reverse circuit for each motor including a switch adapted to be closed by the carrier as it passes a loading station and a switch normally open when the station is in inoperative position and adapted to be closed when the gates of the station move to operative position.

26. An elevating conveyor comprising a pair of vertical chains having opposite runs arranged parallel and moving upwardly and downwardly respectively, a carrier connected between said chains to move therewith, a loading station associated with the upwardly moving runs of the chains and including a station member movable from an inoperative position out of the path of said carrier to an operative position whereby said carrier will pick up an article arranged on said station member, a plurality of unloading stations associated with the downwardly moving runs of the chains, an article holder adapted to travel on said carrier, said article holder and said carrier being provided with a plurality of coacting pairs of contacts, a key adapted to connect either pair of the contacts of said holder to electrically connect the corresponding contacts of the carrier, a contact member associated with each unloading station and adapted to establish electrical connection with the carrier contacts of each pair, each unloading station including a station member movable from an inoperative position out of the path of said carrier to an operative position whereby an article on the carrier will be deposited thereon, a motor for moving the station member of each unloading station to operative position, each motor including in its circuit one of the pairs of carrier contacts and the associated contacts of said article holder whereby the arrangement of said key between selected pairs of article holder contacts will effect operation of the proper motor to determine the destination of the article holder.

27. Apparatus constructed in accordance with claim 26 wherein the motor of each unloading station is provided with a reverse circuit to swing the station member thereof to inoperative position after a carrier has passed such station, said reverse circuit being dependent upon the associated station member having been previously moved to operative position.

28. An article holder for an elevating conveyor comprising a box-like structure, a plurality of pairs of electrical contact elements each having a portion arranged externally of the holder for engagement with coacting contacts of a carrrier of a conveyor for determining the destination of the holder, and a key adapted to be selectively connected between the pairs of contact elements.

29. An article holder for an elevating conveyor comprising a box-like structure, a plurality of pairs of electrical contact elements each having a portion arranged externally of the holder for engagement with coacting contacts of a carrier of a conveyor for determining the destination of the holder, each pair of contact elements being provided with free resilient ends, said box-like structure being provided with an opening adjacent each pair of such free ends, and a key adapted to be selectively inserted in said openings for engagement between the resilient ends of said contact elements.

30. A conveyor comprising endless conveying means, a carrier connected to said conveying means to move therewith, a loading station arranged to support an article holder to be picked up by said carrier as the latter passes the loading station, a station selecting member, said carrier being provided with a plurality of holders adapted to receive said selecting member, a plurality of unloading stations each including a station member normally arranged out of the path of travel of said carrier, electrical means associated with each unloading station member and operative for moving the latter to operative position in the path of said carrier to receive an article therefrom, means arranged adjacent each unloading station and corresponding in arrangement to the holders of said carrier to be selectively operated by a selecting member for actuating one of said electrical means according to the selected unloading station, said electrical means including a reversing circuit, and means associated with each unloading station and dependent upon such stations having been previously moved to operative position for closing said reversing circuit and returning the previously operated unloading station member to inoperative position.

31. An elevating conveyor comprising endless conveying means including a carrier movable therewith, an article holder, a loading station including a member adapted to support an article holder in the path of said carrier to be picked up thereby, a station selecting member, said article holder being provided with a plurality of supporting means for selectively receiving said selecting member, a plurality of unloading stations each including a member normally arranged out of the path of said carrier and movable into the path of the carrier to pick up an article holder thereon, electrical means including a motor operative for moving each unloading station to and from operative position, circuit closing means associated wth each motor at the approach to the corresponding unloading station and corresponding in position to one of said supporting means whereby the latter operates to close a circuit through the motor of the selected unloading station, a reverse circuit for each motor, and circuit closing means for each reverse circuit rendered operative by the movement of the associated unloading station member to operative position and after an article holder has been deposited thereon.

32. A conveyor comprising conveying means including a carrier movable therewith, an unloading station and a plurality of loading stations associated with said conveying means, each unloading station including a station member normally arranged out of the path of travel of said carrier and movable into the path thereof to permit the carrier to pick up an article from a loading station member, an auxiliary conveying device associated with each loading station and including a plurality of load supporting rollers, each loading station member including a plurality of load supporting rollers arranged in the plane of the first named load supporting rollers and inclined from the horizontal whereby articles on each auxiliary conveying device tend to move to a position on each loading station in the path of travel of the carrier, each station member being arranged in the path of articles on the associated auxiliary conveying device when in normal position to act as a stop for the articles, means carried by each station member and acting when the latter is in operative position to limit the movement of an article in the path of travel of the carrier to be picked up thereby, and means operative upon the approach of the carrier to a loading station having an article thereon for effecting movement of the associated station member to operative position.

33. Apparatus constructed in accordance with claim 32 wherein the means for moving each station member to operative position comprises an electrical device, a circuit for said electrical device, a switch for said circuit adapted to be closed upon the approach of a carrier, and a normally open switch in said circuit adapted to be closed by an article arranged at the loading station.

34. A conveyor comprising endless conveying means having a carrier connected thereto, a support movable with said carrier, a selector movable on said support, a loading station and a plurality of unloading stations associated with said conveying means, each unloading station including a station member normally inoperative out of the path of said carrier and movable to operative position in the path of said carrier to intercept an article carried thereby, means for operating each unloading station member including a control device, each control device being arranged in a different relative position to be operated by said selector according to its position on said support, a station selecting means arranged adjacent said loading station, said selecting means including a device manually movable to a predetermined position in accordance with the desired destination of an article to be conveyed from the loading station and arranged in the path of travel of the selector for engaging the latter and moving it to a position corresponding to said predetermined position.

35. Apparatus constructed in accordance with claim 34 wherein said selecting means comprises an inverted V-shaped member having its arms arranged in the plane of travel of a portion of said selector whereby one of said arms is adapted to move the selector to a position corresponding to the center of said selecting means, and manual means for moving said selecting means to a predetermined position according to the unloading station at which it is desired to discharge an article.

In testimony whereof we affix our signatures.

HENRY R. GOTTHARDT.
WILLIAM E. CAIN.